United States Patent
Sharifi et al.

(10) Patent No.: US 10,439,494 B2
(45) Date of Patent: Oct. 8, 2019

(54) INDUCTOR CURRENT SENSING AND REGULATION FOR POWER CONVERTER

(71) Applicant: Texas Instruments Incorporated, Dallas, TX (US)

(72) Inventors: Reza Sharifi, Sunnyvale, CA (US); Kevin Scoones, San Jose, CA (US); Orlando Lazaro, Dallas, TX (US); Alvaro Aguilar, Irving, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/909,078

(22) Filed: Mar. 1, 2018

(65) Prior Publication Data

US 2019/0058398 A1   Feb. 21, 2019

Related U.S. Application Data

(60) Provisional application No. 62/545,665, filed on Aug. 15, 2017.

(51) Int. Cl.

| H02M 3/158 | (2006.01) |
| H02M 1/36 | (2007.01) |
| H02M 3/06 | (2006.01) |
| H02M 1/08 | (2006.01) |
| H02M 1/00 | (2006.01) |
| H02M 3/156 | (2006.01) |
| G05F 1/56 | (2006.01) |
| G05F 1/595 | (2006.01) |

(52) U.S. Cl.
CPC ............ *H02M 3/158* (2013.01); *H02M 1/08* (2013.01); *H02M 1/36* (2013.01); *H02M 3/06* (2013.01); *G05F 1/562* (2013.01); *G05F 1/595* (2013.01); *H02M 3/156* (2013.01); *H02M 2001/0009* (2013.01); *H02M 2001/0025* (2013.01); *H02M 2003/1566* (2013.01)

(58) Field of Classification Search
CPC .......... G05F 1/274; G05F 1/283; G05F 1/284; H02M 3/156; H02M 2003/1566
USPC ................................ 323/241, 274, 282–284
See application file for complete search history.

(56) References Cited

U.S. PATENT DOCUMENTS

| 5,892,450 A | 4/1999 | Scoones et al. |
| 9,083,230 B2 | 7/2015 | Narimani et al. |
| 9,160,232 B2 | 10/2015 | Thomas et al. |
| 9,325,252 B2 | 4/2016 | Narimani et al. |
| 9,520,800 B2 | 12/2016 | Tian et al. |

(Continued)

OTHER PUBLICATIONS

International Search Report for PCT/US2018/000233 dated Dec. 20, 2018.

*Primary Examiner* — Gary A Nash
(74) *Attorney, Agent, or Firm* — Michael A. Davis, Jr.; Charles A. Brill; Frank D. Cimino

(57) ABSTRACT

In described examples of methods and control circuitry to control a power conversion system, a regulator circuit is coupled to provide switching control signals according to a regulation signal to operate a plurality of converter switches to generate a voltage signal at a switching node. A compensation sense circuit is coupled to provide a compensation pulse signal having a duty cycle that represents a percentage of time that a current flowing through the switching node is above a threshold value. A current compensation circuit adjusts the regulation signal according to the compensation pulse signal.

14 Claims, 5 Drawing Sheets

(56) References Cited

U.S. PATENT DOCUMENTS

| | | |
|---|---|---|
| 9,559,541 B2 | 1/2017 | Cheng et al. |
| 9,748,862 B2 | 8/2017 | Cheng et al. |
| 9,866,113 B1 | 1/2018 | Assaad |
| 9,929,653 B1 | 3/2018 | Mercer |
| 10,050,515 B1 | 8/2018 | Chakraborty |
| 2010/0253313 A1* | 10/2010 | Herzer ............... H02M 3/156 323/312 |
| 2010/0308784 A1 | 12/2010 | Scoones et al. |
| 2011/0018511 A1 | 1/2011 | Carpenter |
| 2011/0199057 A1 | 8/2011 | Ivanov et al. |
| 2011/0235831 A1 | 9/2011 | Kaiho |
| 2011/0316503 A1 | 12/2011 | Huang |
| 2012/0098512 A1* | 4/2012 | Kirchner ............. H02M 3/07 323/284 |
| 2013/0334987 A1 | 12/2013 | Garg |
| 2014/0232364 A1 | 8/2014 | Thomas |
| 2015/0207401 A1 | 7/2015 | Zhang |
| 2015/0340952 A1* | 11/2015 | Manohar ............. H02M 3/158 323/271 |
| 2016/0118886 A1 | 4/2016 | Zhang |
| 2016/0254745 A1 | 9/2016 | Lim et al. |
| 2016/0254746 A1 | 9/2016 | Lerdworatawee |
| 2016/0299554 A1 | 10/2016 | Kumar |
| 2016/0301303 A1* | 10/2016 | Bari ................... H02M 3/156 |
| 2016/0315539 A1 | 10/2016 | Lee |
| 2016/0373002 A1* | 12/2016 | Borfigat ............... H02M 1/32 |
| 2017/0126120 A1 | 5/2017 | Chakraborty et al. |
| 2017/0149335 A1 | 5/2017 | Morroni |
| 2017/0256950 A1 | 9/2017 | Kuai |
| 2018/0006559 A1 | 1/2018 | Chen |

\* cited by examiner

INDUCTOR CURRENT SENSING AND REGULATION FOR POWER CONVERTER

CROSS-REFERENCE TO RELATED APPLICATION

This application claims priority to, and the benefit of, U.S. Provisional Patent Application No. 62/545,665, entitled "Accurate and Loss-Less Inductor Current Sensing and Regulation," filed Aug. 15, 2017, the entirety of which is hereby incorporated by reference.

BACKGROUND

High efficiency power supplies are desirable for a variety of systems, such as for battery-operated systems including mobile phones, tablets, laptops and other user devices. Battery management systems include power conversion circuits to control battery charging with controlled voltages and regulated output currents. Accurate average output current regulation is desirable, but involves use of a sense element, which adds to the circuit die size and cost.

SUMMARY

In described examples of systems, methods and circuitry to control a power conversion system, a regulator circuit is coupled to provide switching control signals according to a regulation signal to control an output signal. A compensation sense circuit is coupled to provide a compensation pulse signal having a duty cycle that represents a percentage of time that a current flowing through the switching node is above a threshold value. A current compensation circuit adjusts the regulation signal according to the compensation pulse signal.

DETAILED DESCRIPTION

Figure 1A:
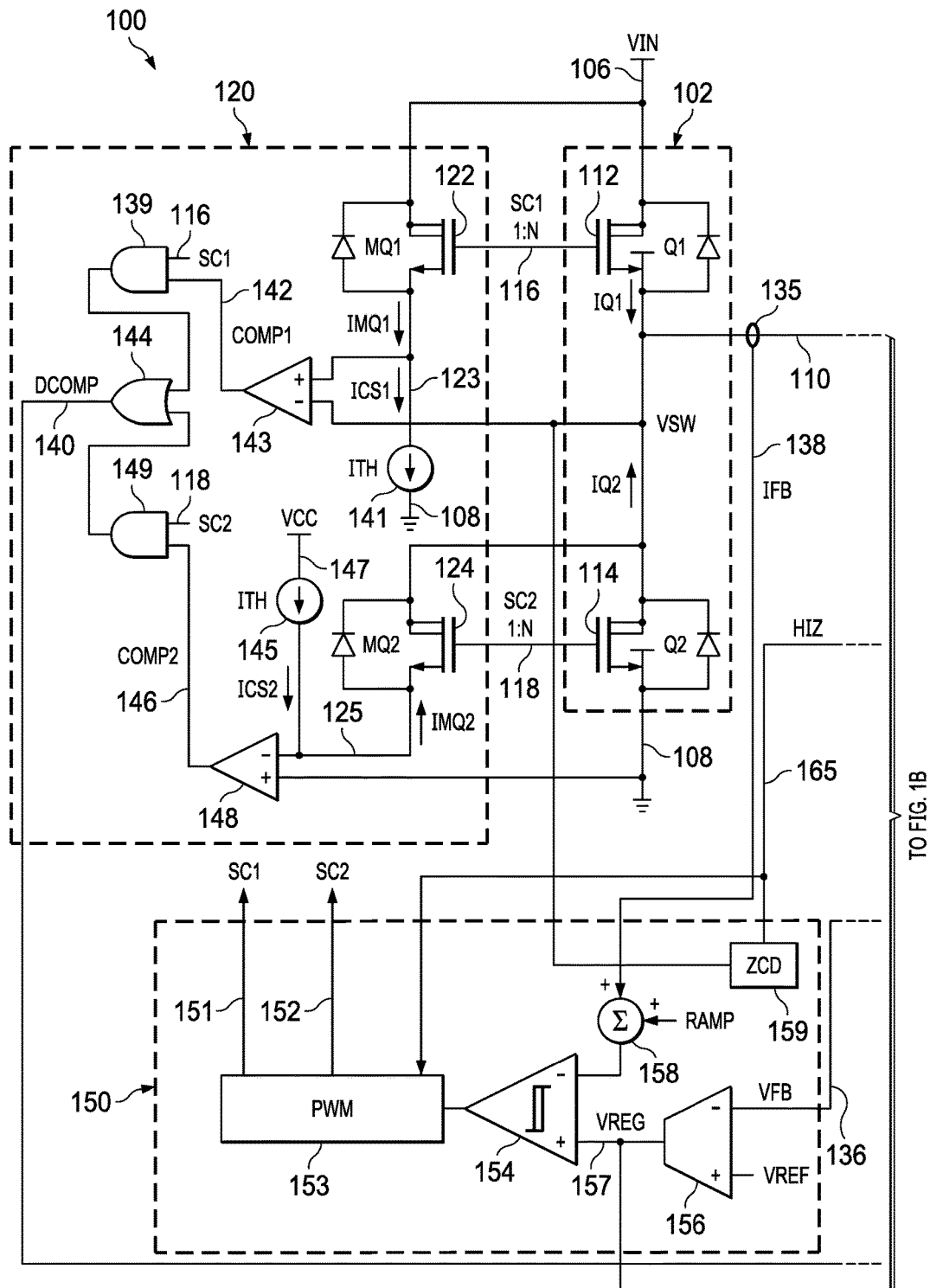
FIGS. 1A and 1B form a system diagram of a power conversion system with a regulator circuit, a compensation sense circuit, and a current compensation circuit.

In the drawings, like reference numerals refer to like elements throughout, and the various features are not necessarily drawn to scale. In this description, the term "couple" or "couples" includes indirect or direct electrical or mechanical connection or combinations thereof. For example, if a first device couples to or is coupled with a second device, that connection may be through a direct electrical connection, or through an indirect electrical connection via one or more intervening devices and connections.

Figure 1B:
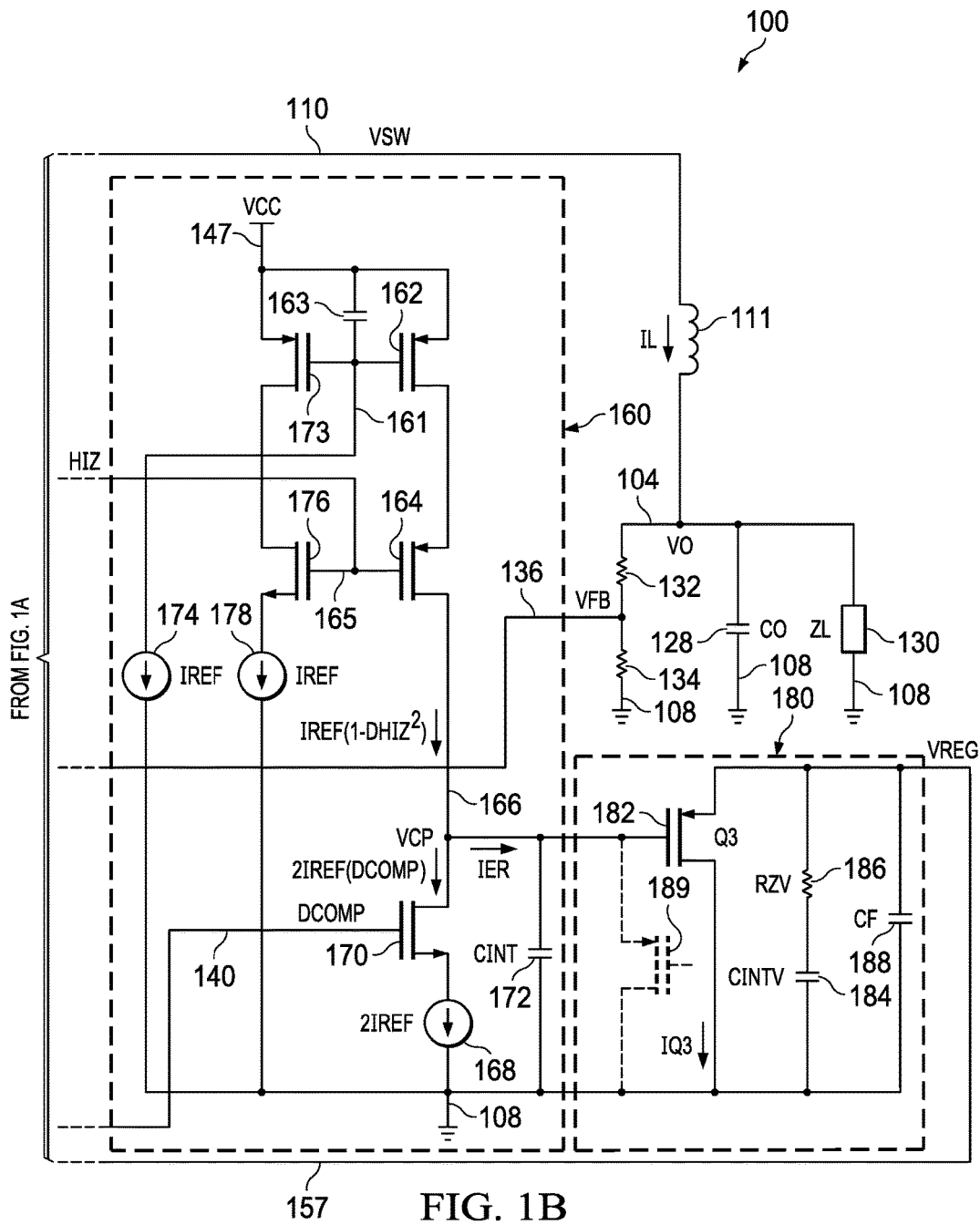

FIGS. 1A and 1B show a two-level buck DC-DC power conversion system 100 with a converter circuit 102. Other examples can include boost converter circuits, buck-boost converter circuits, cuk converter circuits, etc. Three-level or higher order switching converter circuits can be used in further examples. The example system 100 includes an output node 104, which delivers an output signal, such as an output voltage signal VO to drive a connected load. The system 100 includes an input node 106 to receive an input signal, such as an input voltage signal VIN. When powered, the system 100 converts the input signal VIN to provide the voltage output signal VO. In one example, the converter circuit 102 operates to regulate the output voltage VO according to a voltage reference signal VREF.

The example converter circuit 102 includes transistor switches connected between the input node 106 and a reference voltage node 108 (e.g., a ground reference). The switching circuit provides a switching node signal to a switching node 110, such as a switching node voltage signal VSW. The example buck converter power conversion circuit 100 also includes an inductor 111 coupled between the switching node 110 and the output node 104. The converter circuit 102 and the inductor 111 provide a buck-type DC-DC converter to provide a controlled output voltage signal VO at the output node 104 by converting input power from the input voltage signal VIN.

The converter circuit 102 in FIGS. 1A and 1B is a two-level converter that includes a first converter switch 112 (e.g., a high side switch labeled Q1) and a second converter switch 114 (e.g., a low side switch labeled Q2) coupled in a series circuit between the input node 106 and the reference voltage node 108. The switches 112 and 114 operate according to first and second switching control signals SC1 and SC2, respectively, to selectively couple the switching node 110 to the input node 106 or to the reference voltage node 108 to provide a voltage signal VSW to the switching node 110. In other examples, the converter circuit 102 can include more or fewer switches to provide an N-level converter, where N is greater than 1.

In the illustrated example, the converter circuit switches 112 and 114 are n-channel MOSFET (e.g., NMOS) transistors coupled to turn on according to a corresponding active high switching control signal. In other examples, different transistor switches can be used (e.g., PMOS, bipolar, IGBTs). The first converter switch 112 in FIGS. 1A and 1B includes a drain connected to the input node 106, a source connected to the switching node 110, and a gate control terminal 116 coupled to receive the first switching control signal SC1. When the first transistor 112 is turned on, a first switch current IQ1 flows from the input node 106 to the switching node 110. The second transistor 114 includes a drain connected to the switching node 110, a source connected to the reference voltage node 108, and a gate control terminal 118 coupled to receive the second switching control signal SC2. When the second transistor 114 is turned on, a second switch current IQ2 flows from the reference voltage node 108 to the switching node 110.

The system 100 also includes a compensation sense circuit 120 coupled to the switching circuit 102. The compensation sense circuit 120 provides a compensation pulse signal DCOMP having a duty cycle that represents a percentage of time that an inductor current IL flowing in the inductor 111 is above a threshold value N×ITH. The compensation sense circuit 120 includes first and second comparator circuits that compare sensed signals representing the first and second switch currents IQ1 and IQ2 to threshold current signals ICS1 and ICS2 that represent the threshold value N×ITH. The first comparator circuit includes a first current monitor or sense transistor 122 (e.g., an NMOS transistor labeled MQ1) coupled to the first converter switch 112 to form a current reference circuit with the first converter switch 112. The first current sense transistor 122 includes a drain connected to the input node 106, and a gate control terminal connected to the gate control terminal 116 of the first converter switch 112. The first current sense transistor 122 also includes a first terminal 123 (e.g., a source) that is connected to the ITH current source and provides a reference signal for comparator 143. The source of the first current sense transistor 122 provides a first resistance proportional to a resistance of the first converter switch 112. This provides a first reference signal (e.g., a voltage across MQ1) that compares against the first switch current IQ1 flowing in the first converter switch 112.

The second comparator circuit includes a second current sense transistor 124 (e.g., an NMOS transistor labeled MQ2) coupled to form a second current mirror circuit with the second converter switch 114. The second current sense transistor 124 includes a drain connected to the switching node 110, and a gate control terminal connected to the gate control terminal 118 of the second converter switch 114. The second current sense transistor 124 includes a second terminal 125 (e.g., a source) that is connected to provide a reference signal for comparator 148. The source of the transistor 124 provides an on state resistance (e.g., RDSON) that is proportional to the resistance of the second converter switch 114, in order to provide a second reference signal that compares against the second switch current IQ2 flowing in the second converter switch 114.

In the illustrated system 100, an output capacitor 128 (labeled CO) is connected between the output node 104 and the reference voltage node 108. The output signal VO drives a load 130 (labeled ZL). The example system 100 provides closed loop regulation of the output signal VO according to a feedback signal VFB from a resistive voltage divider circuit formed by divider resistors 132 and 134. The resistors 132 and 134 are connected in series with one another between the output node 104 and the reference voltage node 108, and the feedback signal VFB is created at a center node 136 that joins the resistors 132 and 134. In other possible implementations, the voltage feedback signal can be taken directly from the output node 104 (VO), and the voltage control set point or reference (VREF in FIGS. 1A and 1B) is scaled accordingly. In some examples, system 100 includes a current sensor 135 that senses the current flowing through (e.g., into or out of) the switching node 110 (e.g., the inductor current IL flowing in the inductor 111), and provides a current sense feedback signal IFB at a feedback node 138.

The compensation sense circuit 120 generates the compensation pulse signal DCOMP having a duty cycle that represents a percentage of time that the current flowing through the switching node 110 is above the threshold value N×ITH. In the illustrated buck converter example, the switching node current is the inductor current IL. In one example, the individual comparator circuits provide corresponding comparator circuit output signals COMP1 and COMP2 that are active HIGH when the corresponding switch current IQ1 or IQ2 is above the threshold value N×ITH. In the example of FIGS. 1A and 1B, the first comparator circuit compares the first switch current IQ1 flowing in the first converter switch 112 with the threshold value N×ITH, and the second comparator circuit compares the second switch current IQ2 flowing in the second converter switch 114 with the same threshold value N×ITH.

The first comparator circuit includes the first current sense transistor 122, a first current source 141, and a first comparator 143. The first current source 141 is coupled between the terminal 123 and the reference voltage node 108 to provide a first threshold current signal ICS1 to the first terminal 123 of the first current sense transistor 122. The first threshold current signal ICS1 has a value labeled ITH, referred to herein as the threshold value ITH. The first comparator 143 includes a first input (labeled "+") that is coupled to the first terminal 123 of the first current sense transistor 122. The first comparator 143 includes a second input (labeled "−") that is connected to the switching node.

The first comparator input node voltage is set by the first threshold current signal ICS1 (e.g., threshold value ITH) and the on state resistance of the sense transistor 122. The first comparator 143 also includes a first comparator circuit output 142 that provides the first comparator signal COMP1 according to (e.g., in response to or based upon) the voltage signal at the node 123. In the example of FIGS. 1A and 1B, the first comparator circuit output 142 provides the COMP1 signal in a first state (e.g., HIGH) in response to the voltage signal at the node 123 being greater than the switching node voltage VSW, or a second state (e.g., LOW) in response to the voltage signal at the node 123 being less than the switching node voltage VSW. In this manner, the example first comparator circuit output 142 provides the signal COMP1 in a first state (e.g., HIGH) in response to the first switch current IQ1 being greater than the threshold value N×ITH, or in the second state (e.g., LOW) in response to first switch current IQ1 being less than the threshold value N×ITH. The on state resistance of the transistor 122 is N times larger than that of the first converter switch 112. The current IMQ1 (e.g., =ICS1=ITH) generates a voltage across the first sense transistor 122 between the nodes 106 and 123. When the current signal IQ1 is greater than N×ITH, the switching node voltage VSW will be lower than comparator input voltage at the node 123, and the comparator output signal COMP1 transitions to a high state.

The second comparator circuit in FIGS. 1A and 1B includes the second current sense transistor 124, a second current source 145, and a second comparator 148. The second current source 145 is coupled to provide a second threshold current signal ICS2 to the second terminal 125 of the second current sense transistor 124, where ICS1 and ICS2 are approximately equal (e.g., with a value ITH). The second current source 145 is coupled between a supply voltage node 147 (e.g., labeled VCC) and the terminal 125 to provide a second threshold current signal ICS2 to the terminal 125 of the second current sense transistor 124. In the illustrated example, the second threshold current signal ICS2 has a value ITH and represents the threshold value. The second comparator 148 includes a first input (labeled "−") that is coupled to the second terminal 125 of the second current sense transistor 124. The second comparator 148 includes a second input (labeled "+") that is connected to the reference voltage node 108. The second comparator 148 also includes an output 146 that provides the second comparator signal COMP2. The voltage at the comparator input node 125 is equal to the voltage across the second sense transistor 124 minus the voltage across 114. In the example of FIGS. 1A and 1B, the second comparator circuit output 146 provides the COMP2 signal in a first state (e.g., HIGH) in response to the second switch current IQ2 being greater than the threshold value (e.g., greater than N×ICS2), or a second state (e.g., LOW) in response to IQ2 being less than N×ICS2.

The example compensation sense circuit 120 further includes a logic circuit, such as an OR gate 144, with a first input coupled to an output of an AND gate 139. The AND gate 139 includes a first input coupled to receive the first comparator signal COMP1, and a second input coupled to the node 116 to receive the first switching control signal SC1. The OR gate 144 includes a second input coupled to an output of a further AND gate 149. The AND gate 149 includes a first input coupled to receive the second comparator signal COMP2, and a second input coupled to the node 118 to receive the second switching control signal SC2. An output 140 of the logic circuit 144 provides the compensation pulse signal DCOMP in a first state (e.g., HIGH) when either the first switch current IQ1 or the second switch current IQ2 is greater than the threshold value N×ITH. The output 140 provides signal DCOMP in a second state (e.g., LOW) when the first switch current IQ1 and the second switch current IQ2 are less than the threshold value N×ITH. The example compensation pulse signal DCOMP has a duty cycle that represents a percentage of time that the current flowing through the switching node 110 (e.g., the inductor current IL flowing in the inductor 111) is above the threshold value N×ITH;

The system 100 also includes a regulator circuit 150 to regulate the output signal VO. The regulator circuit 150 includes outputs 151 and 152 that provide the switching control signals SC1 and SC2 as pulse width modulated signals according to a regulation signal VREG to control the output voltage signal VO. The first regulator output 151 is connected to the gate control terminal 116 to provide the first switching control signal SC1 to the first converter switch 112. The second regulator output 152 is connected to the gate control terminal 118 to provide the second switching control signal SC2 to the second converter switch 114. In one example, the regulator circuit 150 is implemented as analog circuitry configured to implement a closed loop voltage control function to regulate VO according to the output voltage feedback signal VFB and the reference signal VREF to drive the output voltage signal VO to a voltage that corresponds to VREF. The circuit in FIG. 1 can regulate output voltage (VO) or the output current IL. If the output current IL is regulated, the target output current is N×ITH. If the output voltage VO is regulated, VO is proportional to VREF. If demanded output current (which is determined by VO and ZL) is less than N×ITH, VO is regulated. If the demanded current rises above N×ITH, the converter 100 regulates the output current, and VO will be lower than target output voltage set by VREF. This control scheme can be also used in current regulation mode only, and for applications that require a fixed output current. When the converter 100 operates in current regulation, the error amplifier 156 operates as a current source, and the error signal VREG is generated by the circuit 180.

In one example, the regulator circuit 150 includes a pulse width modulation (PWM) circuit 153 that is configured to generate the switching control signals SC1 and SC2 at the respective outputs 151 and 152. The PWM circuit 153 generates the signals SC1 and SC2 with a controlled duty cycle in individual switching cycles to operate the switches 112 and 114 according to a modulator signal from a PWM modulator or hysteresis comparator 154. The PWM modulator 154 has a first input (+) coupled to receive the regulation signal VREG, and a second input (−) coupled to receive a ramp carrier signal from a summing junction 158. In operation, the PWM modulator 154 modulates the ramp carrier signal with the regulation signal VREG, and provides an output to the PWM circuit 153 in a first state (e.g., HIGH) when the regulation signal VREG exceeds the ramp signal, and in a second state (e.g., LOW) when the regulation signal VREG is below the ramp signal. The duty cycle of the output signal from the PWM modulator represents a ratio or proportion of time in a given switching cycle during which converter switches 112 and/or 114 are turned on. The illustrated example includes a summing junction 158 to sum a ramp signal RAMP with the current feedback signal IFB from the current sensor 135 at the node 138. In other implementations, the current feedback is not used in the PWM regulation, and the summing junction 158 and current sensor 135 can be omitted. In one example, the output of the current sensor 135 may not be an accurate output sense signal, and is only used for current loop feedback. Accurate regulation of output current is achieved by the circuits 120, 160 and 180 is independent of the accuracy of the sensor 135.

The regulator circuit 150 includes an error amplifier 156 with an output 157 that provides the regulation signal VREG to regulate the output voltage VO according to the voltage reference signal VREF and the voltage feedback signal VFB. In one example, the error amplifier 156 is a transconductance amplifier that provides an analog regulation signal VREG according to the difference between the amplitudes of the voltage reference signal VREF and the voltage feedback signal VFB. In one example, the regulator circuit 150 also controls the duty cycle of the switching control signals SC1 and SC2 at least partially according to (e.g., at least partially in response to, or at least partially based upon) the current feedback signal IFB.

The example regulator circuit 150 also includes a zero current detection (ZCD) circuit 159 connected to receive the switching node 110. The ZCD circuit 159 compares the switching node voltage signal VSW to the voltage (e.g., ground) of the reference node 108. When the current IQ2 is zero, VSW reaches the voltage of the reference node 108 and the ZCD circuit 159 provides an active (e.g., HIGH) voltage signal HIZ. In operation, the ZCD circuit 159 provides the control signal HIZ to a charge pump circuit 160 according to the switching node voltage signal VSW. In the illustrated example, the ZCD circuit 159 provides the signal HIZ in a first state (e.g., HIGH) when the switching node voltage signal VSW indicates that the inductor current IL is zero. The ZCD circuit 159 provides the HIZ signal in a second state (e.g., LOW) when the switching node voltage signal VSW indicates that the inductor current IL is greater than zero. In one example, the charge pump circuit uses the HIZ to implement output current regulation using the compensation pulse signal DCOMP in both continuous conduction mode (CCM) and discontinuous conduction mode (DCM) operating modes of the power conversion system 102. Also, the regulator circuit 150 in one example operates in CCM in which the inductor current IL does not reach zero, or DCM in which the inductor current IL is zero for a portion of each switching cycle. In one example, the regulator circuit 150 switches between CCM and DCM operation, according to one or more output loading conditions, such as output voltage, output current, etc.

The power conversion system 100 includes a charge pump circuit 160 coupled to the output 140 of the compensation sense circuit 120 to receive the compensation pulse signal DCOMP. An output 166 of the charge pump circuit 160 generates a charge pump voltage signal VCP according to the duty cycle of the compensation pulse signal DCOMP. The example charge pump circuit 160 includes a first internal 161 connected to a gate control terminal of a PMOS transistor 162. A filtering capacitor 163 is connected between the internal node 161 and the supply voltage node 147 (VCC). A second PMOS transistor 164 includes a source terminal connected to a drain terminal of the first PMOS transistor 162, and a gate control terminal 165 connected to receive the HIZ control signal from the ZCD circuit 159. A drain terminal of the PMOS transistor 164 generates the charge pump voltage signal VCP at a charge pump output node 166.

The charge pump circuit 160 includes a current source 168 connected in series with an NMOS transistor 170 between the charge pump output node 166 and the voltage of the reference node 108. The NMOS transistor 170 includes a drain terminal connected to the charge pump output node 166, a gate control terminal connected to receive the compensation pulse signal DCOMP from the compensation sense circuit output 140. The current source 168 is connected between the source terminal of the transistor 170 and the reference voltage node 108. Also, the charge pump circuit 160 includes an integrating capacitor 172 (labeled CINT) connected between the charge pump output node 166 and the reference voltage node 108. In this configuration, when the compensation pulse signal DCOMP is high, the transistor 170 is turned on, and the transistor 170 conducts current from the charge pump output node 166 with an amplitude set by the current source 168. When the compensation pulse signal DCOMP is low, the transistor 170 is off. An error current (IER shown in FIGS. 1A and 1B) flows out of the charge pump output node 166 into the capacitor 172. The error current IER is the sum of a current IREF(1−DHIZ$^2$) from the transistor 164, and the current 2IREF(DCOMP) flowing from the output node 166 to the transistor 170.

The charge pump circuit 160 operates to control the amplitude of the charge pump voltage signal VCP according to the duty cycle of the compensation pulse signal DCOMP. The current source 168 conducts a current with a value 2IREF. Also, when the transistor 164 is turned on (e.g., when the control signal HIZ is low), the current through the transistor 164 is set by a current mirror circuit. This mirrored current flowing in the transistor 164 is determined by a reference current value IREF and the duty cycle of the control signal HIZ. For CCM operation, the control signal HIZ remains low (e.g., because the inductor current IL remains above zero). The transistor 164 remains on, and the current flowing in the transistor 164 has a value of IREF. In CCM operation, the voltage VCP across the integrating capacitor 172 is regulated to a value that is determined by the duty cycle of the compensation pulse signal DCOMP. For example, when the duty cycle of the DCOMP signal is 50%, the transistor 170 is turned on for half the duration of each switching cycle of the system 100.

While the transistor 170 is turned on, a current with a value of 2IREF flows through the transistor 170, and a current with a value of IREF flows through the transistor 164. The error current IER in this state has a value of −IREF to discharge the integrating capacitor 172. The transistor 170 is turned off for the remaining half of the switching cycle. With the transistor 170 off, the error current IER has a value of +IREF to charge the integrating capacitor 172. When the duty cycle of the signal DCOMP is 50%, the integrating capacitor 172 is alternately charged and discharged for equal amounts of time, and the average amplitude of the charge pump output voltage signal VCP is approximately constant. If the duty cycle of the signal DCOMP deviates from 50%, the charging and discharging of the integrating capacitor 172 is unbalanced, and the average voltage VCP changes accordingly.

The charge pump circuit 160 in FIGS. 1A and 1B also accommodates DCM operation. The example charge pump circuit 160 also includes a third PMOS transistor 173 with a source connected to the supply voltage node 147 (VCC), and a gate control terminal connected to the first internal node 161. The transistors 173 and 162 form a current mirror, and the current flowing through the transistor 162 is set by the current flowing through the transistor 173. Another current source 174 is connected between the node 161 and the reference voltage node 108. The current source 174 has a value IREF. A second NMOS transistor 176 includes a drain connected to the drain of the transistor 173, and a source connected to a current source 178. The current source 178 has a value of IREF, and is connected between the source of the transistor 176 and the reference voltage node 108. The gate control terminal of the transistor 176 is connected to the gate control terminal 165 of the transistor 164, in order to receive the control signal HIZ.

In this configuration, the transistor 176 is turned on and the transistor 164 is turned off in response to a high HIZ signal state (e.g., when the inductor current IL is zero). In this state, the error current IER is set according to the current 2IREF(DCOMP) flowing through the transistor 170 based upon the duty cycle of the DCOMP signal from the compensation sense circuit 120. The inductor current IL reaches zero in portions of individual switching cycles of the system 100 for DCM operation. The inductor current IL is non-zero for CCM operation, and for portions of the switching cycles in DCM operation. In response to the inductor current being non-zero, the HIZ signal is low, the transistor 176 is turned off, and the transistor 164 is turned on. In this state, the current flowing through the transistor 164 into the charge pump output node 166 has a value of IREF(1+DHIZ). The current that flows through the transistor 164 is IREF(1+DHIZ) during the state that HIZ is LOW. On average, the current that flows is IREF(1−DHIZ$^2$).

The power conversion system 100 also includes a current compensation circuit 180. The charge pump circuit output 166 delivers the voltage signal VCP to the current compensation circuit 180. The current compensation circuit 180 adjusts the regulation signal VREG according to the compensation pulse signal DCOMP. In some implementations, the circuit 180 adjusts VREG according to the duty cycle of the DCOMP signal in CCM operation and portions of each converter cycle in DCM operation. In the illustrated example, the current compensation circuit 180 adjusts the regulation signal VREG to regulate the duty cycle of the DCOMP signal to a reference duty cycle value (e.g., 50%). The example 50% duty cycle regulation point serves to drive the average inductor current IL to N times a value that corresponds to the threshold value ITH of the current sources 141 and 145 in the compensation sense circuit 120. In other examples, the ratios of the charge pump circuit current sources 168, 174 and 178 can be adjusted, so that the charge pump 160 and the current compensation circuit 180 adjust the regulation signal VREG to regulate the duty cycle of the DCOMP signal to a different reference duty cycle value. A capacitor 184 (e.g., labeled CINTV) is connected in series with a resistor 186 (e.g., labeled RZV) between the error amplifier output node 157 and the reference voltage node 108. A filter capacitor 188 (e.g., labeled CF) is connected between the node 157 and the reference voltage node 108 to stabilize the voltage of the regulation signal VREG. The compensation components RZV, CINTV and CF provide compensation for voltage regulation when the transistor 182 is off and the output current is below N×ITH. When the output current regulation is operational and the transistor 182 is in the saturation region, RZV, CINTV and CF are alternating current (AC) shorted by the source impedance of the transistor 182. During voltage regulation, the transistor 182 is off, and the compensation network at the output of error amplifier 156 stabilizes the converter 100. When the converter 100 operates in current regulation, the charge pump circuit 160 controls the converter 100, and the signal VCP controls VREG. In this case, the transconductance error amplifier 156 operates as a current source, and the compensation network does not affect the regulation signal VREG.

The example current compensation circuit 180 in FIGS. 1A and 1B includes a PMOS transistor 182 (e.g., labeled Q3) with a source connected to the output 157 of the error amplifier 156 in the regulator circuit 150. The transistor 182 includes a drain terminal connected to the reference voltage node 108. The gate control terminal of the transistor 182 is connected to receive the charge pump voltage signal VCP from the charge pump output node 166. As schematically shown in FIGS. 1A and 1B, the charge pump voltage signal VCP controls the gate of the transistor 182, which operates as a source follower to set the amplitude of the VREG voltage signal. The transistor 182 selectively conducts a current IQ3 from the transconductance error amplifier output node 157 to modify the converter operation according to the charge pump voltage signal VCP. A filter capacitor 188 (e.g., labeled CF) is connected between the node 157 and the reference voltage node 108 to filter out high frequency noise. In one example, the current compensation circuit 180 includes a PMOS clamp transistor 189 connected between the charge pump output node 166 and the reference voltage node 108. In operation, the clamp transistor 189 can be set to a proper voltage to keep node 166 from railing. This improves current regulation loop response when enabled or takes over control.

The illustrated power conversion system 100 and the control circuitry thereof can be implemented, in whole or in part, using control integrated circuits (ICs). In one example, the converter circuit 102, the compensation sense circuit 120, the regulator circuit 150, the charge pump circuit 160 and the current compensation circuit 180 are formed in a single integrated circuit (not shown). In various alternative implementations, one or more components of these circuits can be implemented outside of the IC. Moreover, one or more system components can be provided in the control IC, such as the inductor 111, the feedback resistive divider circuit 132, 134, etc. Also, the control circuitry formed in an integrated circuit can include inputs to receive control signals, such as a signal to set the threshold value ITH for circuit board adjustment of the threshold regulation point for the inductor current IL. Other possible IC inputs can include an adjustment input to set one or more of the relative values of the current sources 168, 174 and/or 178, in order to provide adjustability of the regulated duty cycle set point for the DCOMP signal.

Figure 2:
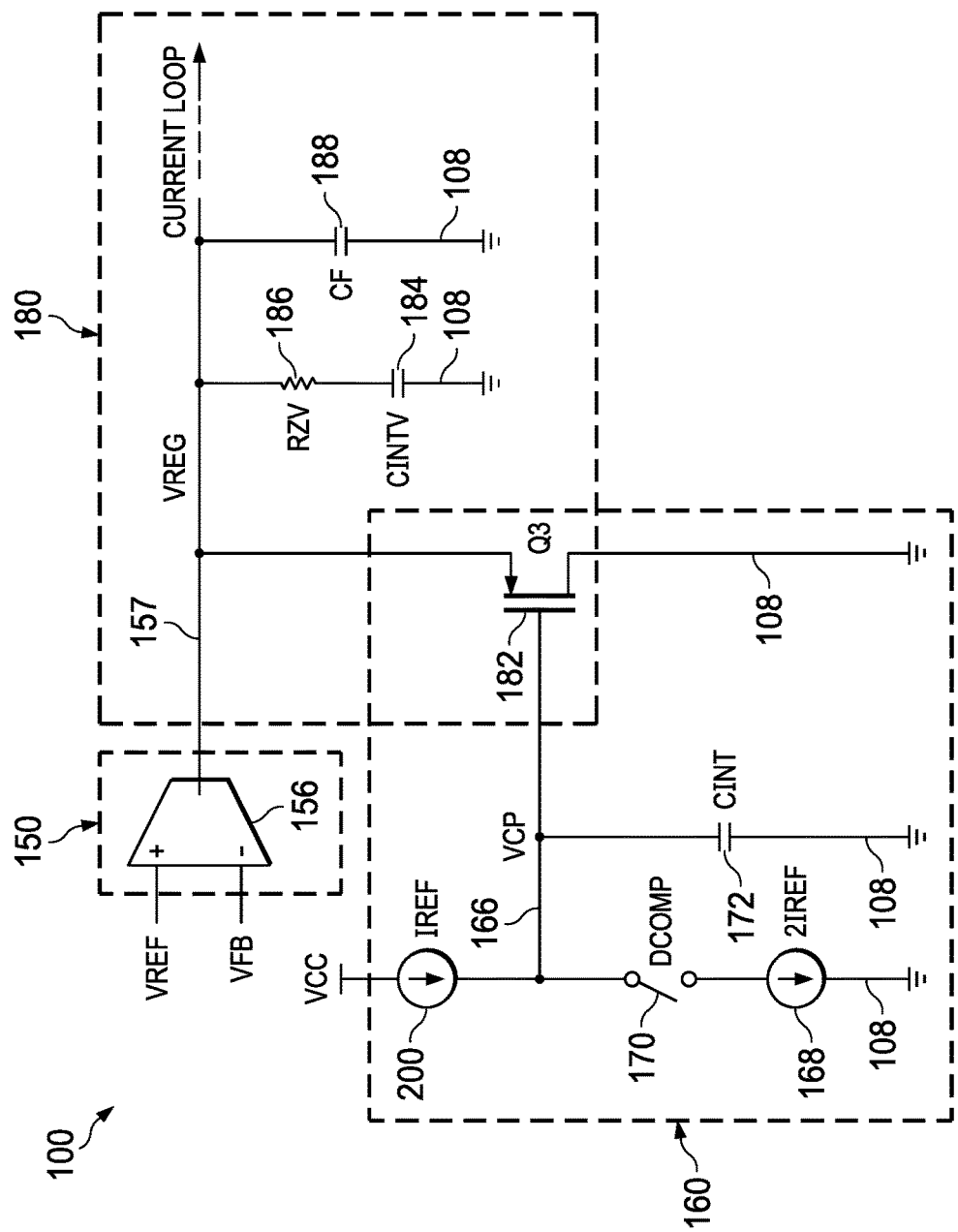
FIG. 2 is a schematic diagram of the regulator and current compensation circuit operating in continuous conduction mode (CCM).
Figure 3:
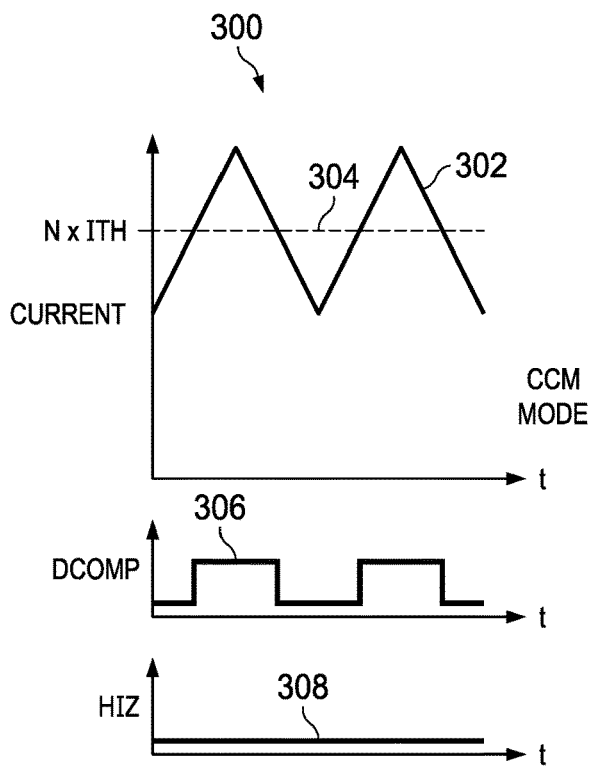
FIG. 3 is an example signal diagram of an inductor current signal, a threshold, a compensation pulse signal and a control signal in CCM operation.

FIGS. 2 and 3 show example CCM operation of the system 100. FIG. 2 shows a simplified diagram of the regulator circuit 150, the charge pump circuit 160 and the current compensation circuit 180 operating in CCM. A signal diagram 300 in FIG. 3 illustrates an example inductor current signal curve 302 (e.g., IL), a threshold curve 304 (e.g., N×ITH), a compensation pulse signal curve 306 (e.g., DCOMP) and a control signal curve 308 (e.g., HIZ) for CCM operation. The inductor current IL is non-zero during CCM operation, and the HIZ signal remains low (curve 308 in FIG. 3). The alternating switching operation of the high and low side converter switches 112 and 114 causes the inductor current signal IL to ramp up and down in each successive converter switching cycle (e.g., curve 302 in FIG. 3). The current mirror transistors 162 and 173 and the current source 174 form a current source 200 in FIG. 2 that generates a current signal with a value IREF at the charge pump output node 166. The transistor 170 operates according to the DCOMP signal to selectively sink a current signal at the charge pump output node 166 with a value 2IREF when the transistor 170 is on.

In the illustrated CCM operation of FIGS. 2 and 3, the duty cycle of the compensation pulse signal DCOMP controls the charging and discharging of the charge pump integrator capacitor 172 to control the voltage signal VCP at the output node 166. In each switching cycle in FIG. 3, the compensation pulse signal DCOMP (curve 306) has a rising edge in response to the inductor current IL (curve 302) rising above the threshold N×ITH (curve 304). In response to the inductor current IL (curve 302) transitioning below the threshold N×ITH (curve 304), the signal DCOMP has a falling edge. The current compensation circuit 180 controls the transistor 170 in FIG. 2 according to duty cycle of the compensation pulse signal DCOMP, in order to selectively adjust or modify the regulation voltage signal VREG. The charge pump circuit 160 and the current compensation circuit 180 provide an inductor current control loop that regulates the duty cycle of the compensation pulse signal DCOMP to 50% in the illustrated example. This closed loop provides regulation against circuit changes, output load condition changes, etc. In other examples, the current signals provided by the current sources 168, 174 and/or 178 can be adjusted to provide closed-loop regulation around a different reference duty cycle. FIG. 3 shows generally steady state operation with the inductor current curve 302 remaining above the threshold curve 304 for one half of each switching cycle, and remaining below the threshold curve 304 during the other half of each switching cycle. As a result, the average inductor current (e.g., the average value of the curve 302) is approximately equal to the threshold value represented by the threshold curve 304.

Figure 5:
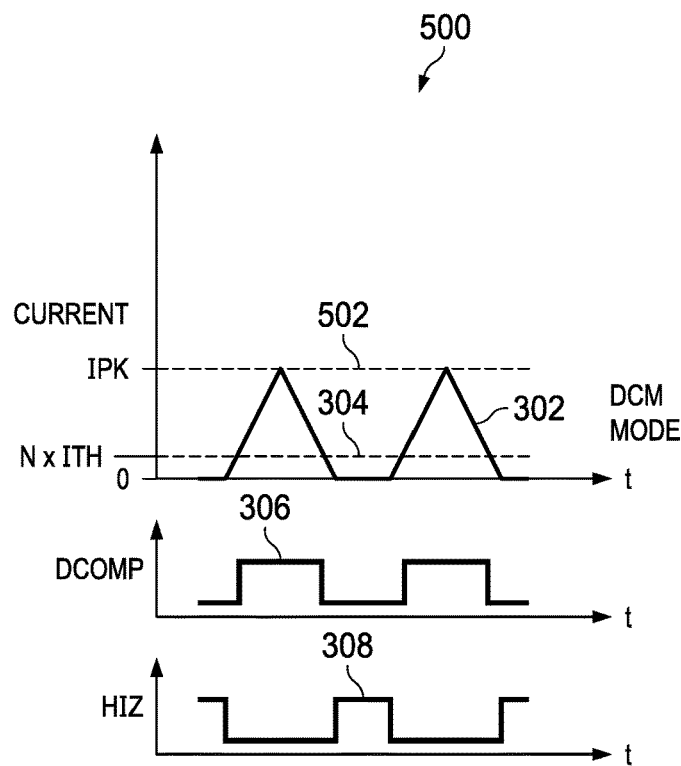
FIG. 5 is an example signal diagram of an inductor current signal, a threshold, a compensation pulse signal and a control signal in DCM operation.
Figure 4:
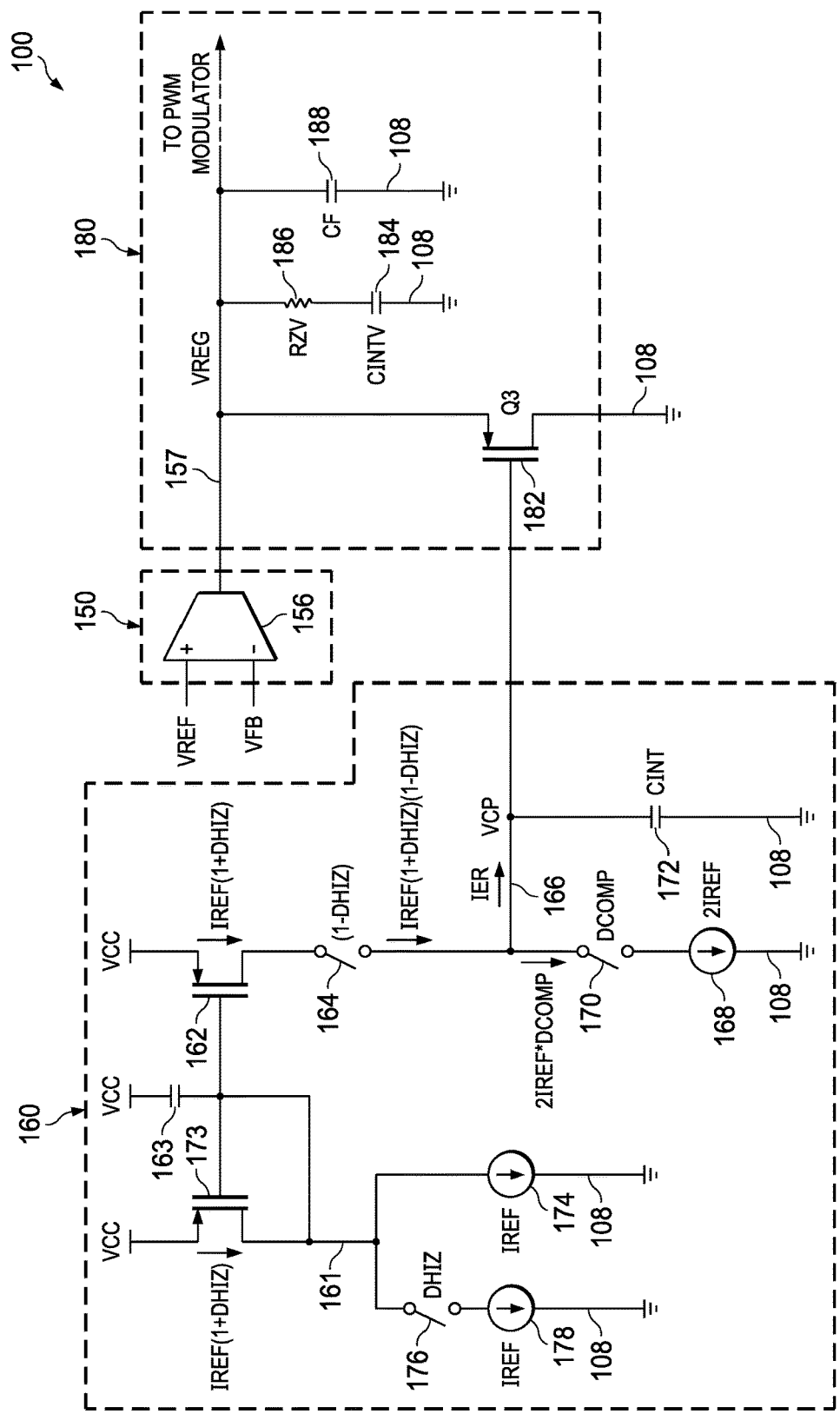
FIG. 4 is a schematic diagram of the regulator and current compensation circuit operating in discontinuous conduction mode (DCM).

FIGS. 4 and 5 show discontinuous mode operation of the system 100 (DCM). FIG. 4 schematically illustrates the regulator circuit 150, the charge pump circuit 160 and the current compensation circuit 180 in simplified form during DCM operation. FIG. 5 shows a signal diagram 500, which illustrates an example inductor current signal curve 302 (e.g., IL), a threshold curve 304 (e.g., N×ITH) and a peak current threshold 502 (IPK). The diagram 500 also shows the compensation pulse signal curve 306 (e.g., DCOMP) and the control signal curve 308 (e.g., HIZ) for DCM operation of the power conversion system 100. The alternating switching of the converter switches 112 and 114 causes the inductor current signal IL (curve 302) to ramp up to a peak current threshold IPK (curve 502), and then down to zero in each successive converter switching cycle. In response to the inductor current reaching zero, the HIZ control signal (curve 308) has a rising edge transition to the high state and remains high while IL is zero.

As in the CCM operation described above, duty cycle of the compensation pulse signal DCOMP controls the charging and discharging of the charge pump integrator capacitor 172 in DCM operation. In each DCM switching cycle in FIG. 5, the compensation pulse signal DCOMP (curve 306) has a rising edge in response to the inductor current IL (curve 302) rising above the threshold N×ITH (curve 304). In response to the inductor current IL (curve 302) transitioning below the threshold N×ITH (curve 304), the signal DCOMP has a falling edge.

Also, the switch 176 (FIG. 4) operates according to the control signal HIZ to selectively adjust the mirrored current provided at the charge pump output node 166 through the switch 164. As shown in the simplified schematic diagram of FIG. 4, the current source 168 and the transistor 170 sink an average current 2*IREF*DCOMP from the charge pump output node 166, where DCOMP is the duty cycle of the compensation pulse signal DCOMP. Also, the current mirror circuitry of the charge pump 160 sources an average current IREF(1+DHIZ)*(1−DHIZ), where DHIZ is the duty cycle of the control signal HIZ.

The charge pump output voltage VCP controls the current loop (and therefore the average output current) through the transistor 182. The closed-loop average current control urges or forces the duty cycle of the signal DCOMP to 50% in CCM, and to a proper duty cycle in DCM. The charge pump circuit 160 and the current compensation circuit 180 regulate the average output current to the set threshold value N×ITH. The following equations represent the average current regulation operation, where ILAVG is the average of the inductor current signal IL:

$$ILAVG = (IPK/2)*(1-DHIZ), \text{ and} \quad (1)$$

$$DCOMP = (1-DHIZ)*((IPK-N*ITH)/IPK). \quad (2)$$

When in regulation (e.g., N*ITH=ILAVG), the following equations are satisfied:

$$DCOMP = (1-DHIZ)*(1-(ILAVG/IPK)), \quad (3)$$

$$DCOMP = (1-DHIZ)*(1-(1-DHIZ)/2), \text{ and} \quad (4)$$

$$DCOMP = (\tfrac{1}{2})*(1-DHIZ)*(1+DHIZ). \quad (5)$$

The described control circuitry and power conversion system examples provide accurate and loss-less inductor current sensing and regulation, without requiring external inductor current sensing circuitry. The average current regulation advantages of the described systems can be implemented without the current sensor 135 and the current feedback. In one possible sensorless example, the inductor current sensor 135 can be omitted, and the control signal HIZ can be generated by a zero current detection circuit (e.g., circuit 159 in FIGS. 1A and 1B) that monitors the voltage across Q1 and Q2. Some described examples control and regulate the output current without the expense of a dedicated current sensing element, which reduces silicon area and cost. The examples facilitate accurate control and/or limiting of average converter output current for improved system performance, reduced device degradation, and improved power efficiency and power density. In the described examples, the control circuitry monitors the converter switch current using sense transistors 122 and 124. Unlike other sensing techniques, which need to track currents at high speed, the compensation sense circuitry 120 includes comparators 143 and 148 to compare Q1 and Q2 current signals with a fixed or adjustable reference value N×ITH. In some examples, the current compensation circuit 180 adjusts the pulse width modulation loop according to the duty cycle information from the compensation pulse signal DCOMP to regulate the average inductor current. Some examples also advantageously eliminate ripple components in the current limit application, which results in smaller and lower DCR inductor options. Described average current regulation examples can be used with any type or form of control scheme in a power conversion system. Also, although described in the context of a two-level converter, the described circuitry and techniques are useful in three-level or higher order power conversion circuits.

Further examples provide a method of controlling a power conversion system 100. In one example, the method includes generating switching control signals (e.g., SC1, SC2), according to a regulation signal (e.g., VREG), to operate converter switches (e.g., 112, 114) to generate a voltage signal VSW at a power conversion system switching node (e.g., switching node 110 described hereinabove). The method further includes providing a compensation pulse signal (e.g., DCOMP) having a duty cycle that represents a percentage of time that a current (e.g., IL) flowing through the switching node is above a threshold value (e.g., ITH). The example method also includes adjusting the regulation signal according to the compensation pulse signal. In one implementation, the regulation signal VREG is adjusted to regulate the duty cycle of the compensation pulse signal to a reference duty cycle value (e.g., 50%).

Modifications are possible in the described embodiments, and other embodiments are possible, within the scope of the claims.

What is claimed is:

1. A power conversion system, comprising:
   a switching node adapted to be coupled through an inductor to an output node;
   a converter circuit having a switching node output and control inputs, the switching node output coupled to the switching node, the converter circuit including converter switches configured to generate a voltage at the switching node output according to switching control signals at the control inputs;
   a compensation sense circuit having a compensation output and a switching node input, the switching node input coupled to the switching node output, and the compensation sense circuit configured to generate a compensation pulse signal at the compensation output responsive to the voltage at the switching node output, the compensation pulse signal having a duty cycle that represents a percentage of time that an inductor current flowing through the switching node is above a threshold value;
   a regulator circuit having a regulator input and regulator outputs, the regulator outputs coupled to the control inputs, the regulator circuit configured to generate the switching control signals as pulse width modulated signals according to a regulation signal at the regulator input;
   a current compensation circuit having a charge pump input and a regulator output, the regulator output coupled to the regulator input, the current compensation circuit configured to adjust the regulation signal according to a charge pump signal at the charge pump input; and
   a charge pump circuit having charge pump output and a compensation input, the charge pump output coupled to the charge pump input, the compensation input coupled to the compensation output, and the charge pump circuit configured to generate the charge pump signal according to the compensation pulse signal.

2. The power conversion system of claim 1, wherein the current compensation circuit is configured to adjust the regulation signal to regulate the duty cycle to a reference duty cycle value.

3. The power conversion system of claim 2, wherein:
   the converter circuit includes a first converter switch connected to the switching node output;
   the converter circuit includes a second converter switch connected to the switching node output; and
   the compensation sense circuit includes:

a first comparator circuit coupled to the first converter switch, the first comparator circuit configured to compare a first switch current flowing through the first converter switch with the threshold value, the first comparator circuit having a first comparator circuit output and configured to provide a first comparator signal at the first comparator circuit output in: a first state in response to the first switch current being greater than the threshold value, or a second state in response to first switch current being less than the threshold value;

a second comparator circuit coupled to the second converter switch, the second comparator circuit configured to compare a second switch current flowing through the second converter switch with the threshold value, the second comparator circuit having a second comparator circuit output and configured to provide a second comparator signal at the second comparator circuit output in: a first state in response to the second switch current being greater than the threshold value, or a second state in response to second switch current being less than the threshold value; and a logic circuit having a first input coupled to the first comparator circuit output, and a second input coupled to the second comparator circuit output, the logic circuit configured to provide the compensation pulse signal in: a first state when either the first switch current or the second switch current is greater than the threshold value, or a second state when the first switch current and the second switch current are less than the threshold value.

4. The power conversion system of claim 3, wherein:
the first comparator circuit includes:
a first current sense transistor coupled to the first converter switch, the first current sense transistor having a first terminal, the first current sense transistor configured to provide a first resistance, proportional to a resistance of the first converter switch, to generate a first sensed signal at the first terminal, the first sensed signal representing the first switch current;
a first current source configured to provide a first threshold current signal to the first terminal, the first threshold current signal representing the threshold value; and
a first comparator having: a first input coupled to the first terminal; and a first output coupled to the first comparator circuit output, the first comparator configured to provide the first comparator signal at the first output according to the first sensed signal; and the second comparator circuit includes:
a second current sense transistor coupled to the second converter switch, the second current sense transistor having a second terminal, the second current sense transistor configured to provide a second resistance, proportional to a resistance of the second converter switch, to generate a second sensed signal at the second terminal, the second sensed signal representing the second switch current;
a second current source configured to provide a second threshold current signal to the second terminal, the second threshold current signal representing the threshold value; and
a second comparator having: a second input coupled to the second terminal; and a second output coupled to the second comparator circuit output, the second comparator configured to provide the second comparator signal at the second output according to the second sensed signal.

5. The power conversion system of claim 1, wherein:
the converter circuit includes a first converter switch connected to the switching node output;
the converter circuit includes a second converter switch connected to the switching node output; and
the compensation sense circuit includes:
a first comparator circuit coupled to the first converter switch, the first comparator circuit configured to compare a first switch current flowing through the first converter switch with the threshold value, the first comparator circuit having a first comparator circuit output and configured to provide a first comparator signal at the first comparator circuit output in: a first state in response to the first switch current being greater than the threshold value, or a second state in response to first switch current being less than the threshold value;
a second comparator circuit coupled to the second converter switch, the second comparator circuit configured to compare a second switch current flowing through the second converter switch with the threshold value, the second comparator circuit having a second comparator circuit output and configured to provide a second comparator signal at the second comparator circuit output in: a first state in response to the second switch current being greater than the threshold value, or a second state in response to second switch current being less than the threshold value; and
a logic circuit having a first input coupled to the first comparator circuit output, and a second input coupled to the second comparator circuit output, the logic circuit configured to provide the compensation pulse signal in: a first state when either the first switch current or the second switch current is greater than the threshold value, or a second state when the first switch current and the second switch current are less than the threshold value.

6. A control circuit, comprising:
a regulator circuit having a regulator input and regulator outputs, the regulator outputs adapted to be coupled through converter switches to a switching node, the regulator circuit configured to generate switching control signals at the regulator outputs according to a regulation signal at the regulator input;
a compensation sense circuit having a compensation output and a switching node input, the switching node input adapted to be coupled to the switching node, and the compensation sense circuit configured to generate a compensation pulse signal at the compensation output responsive to a voltage at the switching node input, the compensation pulse signal having a duty cycle that represents a percentage of time that a current flowing through the switching node is above a threshold value;
a current compensation circuit having a charge pump input and a regulator output, the regulator output coupled to the regulator input, the current compensation circuit configured to adjust the regulation signal according to a charge pump signal at the charge pump input; and
a charge pump circuit having a charge pump output and a compensation input, the charge pump output coupled to the charge pump input, the compensation input coupled to the compensation output, and the charge pump circuit configured to generate the charge pump signal according to the compensation pulse signal.

7. The control circuit of claim 6, wherein the current compensation circuit is configured to adjust the regulation signal to regulate the duty cycle to a reference duty cycle value.

8. The control circuit of claim 7, wherein:
the converter switches include a first converter switch connected to the switching node;
the converter switches include a second converter switch connected to the switching node; and
the compensation sense circuit includes:
 a first comparator circuit having a first comparator circuit output and configured to provide a first comparator signal at the first comparator circuit output in: a first state in response to a first switch current flowing through the first converter switch being greater than the threshold value, or a second state in response to first switch current being less than the threshold value;
 a second comparator circuit having a second comparator circuit output and configured to provide a second comparator signal at the second comparator circuit output in: a first state in response to a second switch current flowing through the second converter switch being greater than the threshold value, or a second state in response to second switch current being less than the threshold value; and
 an OR gate having a first input coupled to the first comparator circuit output, and a second input coupled to the second comparator circuit output, the OR gate configured to provide the compensation pulse signal in: a first state when either the first comparator signal or the second comparator signal are in the first state, or a second state when the first comparator signal and the second comparator signal are in the second state.

9. The control circuit of claim 8, wherein:
the first comparator circuit includes:
 a first current sense transistor having a first terminal, the first current sense transistor configured to provide a first resistance, proportional to a resistance of the first converter switch, to generate a first sensed signal at the first terminal, the first sensed signal representing the first switch current;
 a first current source configured to provide a first threshold current signal to the first terminal, the first threshold current signal representing the threshold value; and
 a first comparator having: a first input coupled to the first terminal; and a first output coupled to the first comparator circuit output, the first comparator configured to provide the first comparator signal at the first output according to the first sensed signal; and
the second comparator circuit includes:
 a second current sense transistor having a second terminal, the second current sense transistor configured to provide a second resistance, proportional to a resistance of the second converter switch, to generate a second sensed signal at the second terminal, the second sensed signal representing the second switch current;
 a second current source configured to provide a second threshold current signal to the second terminal, the second threshold current signal representing the threshold value; and
 a second comparator having: a second input coupled to the second terminal; and a second output coupled to the second comparator circuit output, the second comparator configured to provide the second comparator signal at the second output according to the second sensed signal.

10. The control circuit of claim 6, wherein:
the converter switches include a first converter switch connected to the switching node;
the converter switches include a second converter switch connected to the switching node; and
the compensation sense circuit includes:
 a first comparator circuit having a first comparator circuit output and configured to provide a first comparator signal at the first comparator circuit output in: a first state in response to a first switch current flowing through the first converter switch being greater than the threshold value, or a second state in response to first switch current being less than the threshold value;
 a second comparator circuit having a second comparator circuit output and configured to provide a second comparator signal at the second comparator circuit output in: a first state in response to a second switch current flowing through the second converter switch being greater than the threshold value, or a second state in response to second switch current being less than the threshold value; and
 an OR gate having a first input coupled to the first comparator circuit output, and a second input coupled to the second comparator circuit output, the OR gate configured to provide the compensation pulse signal in: a first state when either the first comparator signal or the second comparator signal are in the first state, or a second state when the first comparator signal and the second comparator signal are in the second state.

11. The control circuit of claim 6, wherein the charge pump circuit is configured to provide: a constant reference current signal to a charge pump output node in a continuous conduction mode; and an adjusted reference current signal to the charge pump output node in a discontinuous conduction mode, wherein an amplitude of the adjusted reference current signal is dependent upon a detected zero current condition of the switching node.

12. The control circuit of claim 6, wherein the regulator circuit, the compensation sense circuit, and the current compensation circuit are formed in a single integrated circuit.

13. A method of controlling a power conversion system, the method comprising:
generating switching control signals, according to a regulation signal, to operate a plurality of converter switches to generate a voltage at a switching node of the power conversion system;
providing a compensation pulse signal having a duty cycle that represents a percentage of time that a current flowing through the switching node is above a threshold value; and
adjusting the regulation signal according to the compensation pulse signal;
wherein providing the compensation pulse signal comprises:
 providing a first comparator signal in: a first state in response to a first switch current flowing through a first converter switch being greater than the threshold value, or a second state in response to first switch current being less than the threshold value;

providing a second comparator signal in: a first state in response to a second switch current flowing through the second converter switch being greater than the threshold value, or a second state in response to second switch current being less than the threshold value; and providing the compensation pulse signal in: a first state when either the first comparator signal or the second comparator signal are in the first state, or a second state when the first comparator signal and the second comparator signal are in the second state.

14. The method of claim 13, wherein adjusting the regulation signal comprises: adjusting the regulation signal to regulate the duty cycle to a reference duty cycle value.

* * * * *